July 3, 1951        C. MINTNER        2,559,542
FISH LURE
Filed June 2, 1948
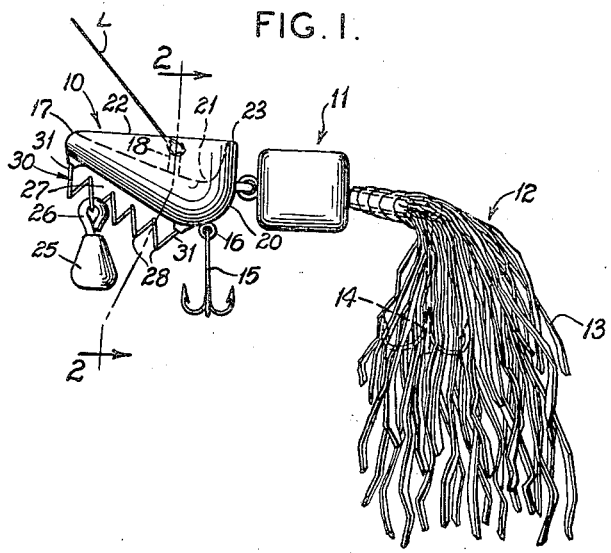
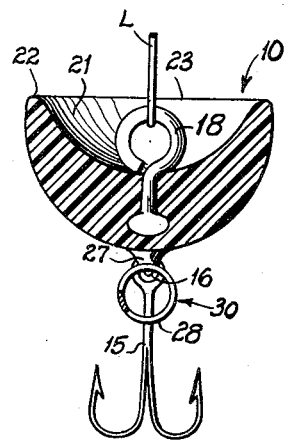
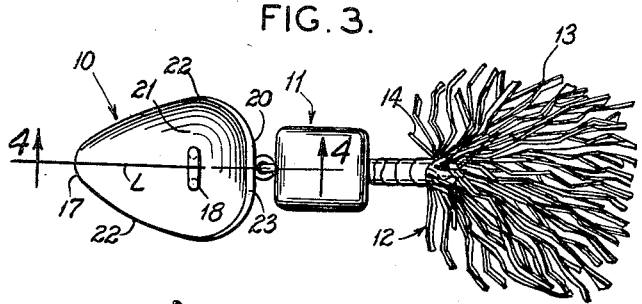
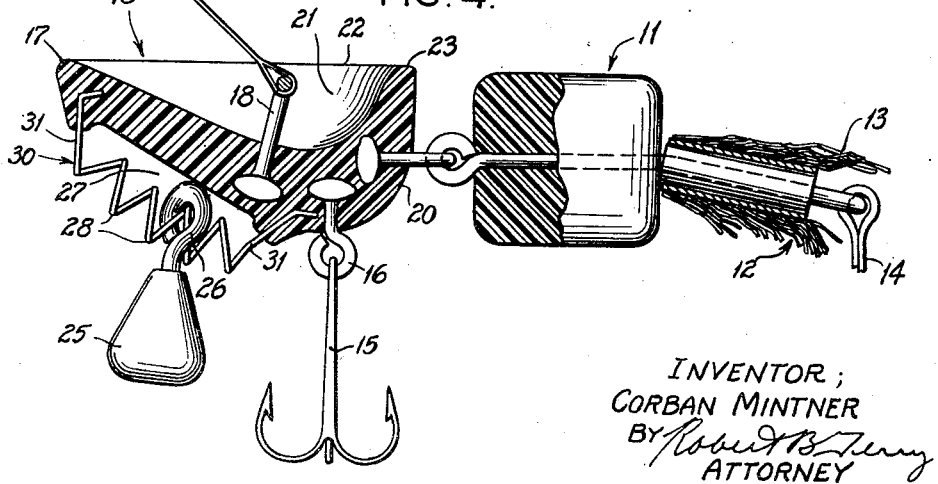
INVENTOR;
CORBAN MINTNER
BY Robert B Terry
ATTORNEY Patented July 3, 1951

2,559,542

UNITED STATES PATENT OFFICE 2,559,542

FISH LURE

Corban Mintner, St. Louis, Mo., assignor of forty-nine per cent to Henry Slazinik, St. Louis, Mo.

Application June 2, 1948, Serial No. 30,648

3 Claims. (Cl. 43—42.22)

This invention relates to improvements in fish lures, and more particularly to an improved bait which is of so-called plug type, and which is adapted when impelled in the water by a casting line or the like, to exhibit, controlledly, a wide variety and range of unusual predetermined movements in attraction of the fish to the bait.

A few attempts have earlier been made to effect a so-called diving action, in other cases a back-and-forth action of the bait and in still other designs, attempts have been made to realize unusual sound effects. None of these, as best can be determined by a considerable number and range of experimental trials, provides either a sufficient degree of attractiveness, or possesses any latitude of variability in nature and degree of eccentric lure movements. Accordingly, it is a major object of the present invention to provide a more attractive, hence more effective lure, particularly for many of the fresh water fish, and to provide facilities for a controlled variation in pattern of lure movement, all in furtherance of the attraction of the lure.

An additional and important object of the invention is attained in improved facilities and combinations thereof rendering the lure selectively adaptable for fishing at a relatively deep setting, a shallow setting or one of moderate depth, and yet enabling it to be used at will as a surface bait, all by facile adjustment of an element of the lure, without tools or particular skill, and without requiring the addition or removal of extraneous appurtenances.

A further and valuable objective realized in the present improvements is attained in a longitudinally adjustable weight, through the adjustment of which the angle of incidence of the bait, or particularly the head portion thereof, may be varied to cause the bait to run at varying depths under the tractive effect of a casting line or the like.

An additional valuable objective is realized in an improved and advanced conformity, imparted preferably to the head portion of the bait or lure, so as to provide an unusual and novel reactive effect thereon by the ambient water, when the lure is being propelled therethrough. In its most advanced form, the lure utilizes combinations of the unique reactive portion aforesaid, and the adjustable or variably positionable weight.

The foregoing and numerous other objects will more clearly appear from the following detailed description of a single selected and preferred embodiment of the invention in a casting bait described in detail in the following description, and from a study of the accompanying drawing, in which:

Fig. 1 is a side elevational view of a lure embodying the present improvements;

Fig. 2 is a transverse sectional view, somewhat enlarged, as taken along line 2—2 of Fig. 1;

Fig. 3 is a top or plan view of the lure or bait of Fig. 1, and

Fig. 4 is an enlarged longitudinal section, with parts of the assembly shown in elevation, and showing a weight element in a position of transition between different adjusted positions.

Referring now by characters of reference to the drawing, the features of primary novelty are by preference embodied as shown in an articulate form of lure, plug or bait, including a head portion generally indicated at 10. Although the head part may be a part of a solid one-piece bait and including the body therewith as a unit, the example selected for present disclosure comprises an intermediate jointedly connected body susceptible of a wobble action with respect to the head 10, and generally indicated at 11. This articulation may be continued as desired, but in the interest of brevity of illustration and description, the member 11 is provided with a tail projection 12 to which is secured for attraction of the fish, a foliate lure element exemplified as a Hawaiian wiggler 13, the latter serving substantially to conceal a multiple hook 14. The head 10 is also preferably provided with a hook 15 pendantly supported below the rear part of the head as by an eye 16.

In the example of the drawing, the head 10 and body 11 are preferably but without restriction, formed of a solid material such as wood, a molded or other plastic, or any suitable preferably floating substance which will resist a protracted action of water and which may be suitably colored as by enamel, paint, lacquer or other finishing materials, and preferably in a bright color or colors for increased attraction.

Proceeding now to describe the novel shaping of the head 10, this is provided with a substantially vertical nose or prow 17, the normal direction of movement being imparted as by a line L, engaging a screw eye or the like 18 located substantially as shown. The head proper, as will appear, is of a gradually increasing depth from its foremost portion to its rearmost portion 20, being through this region, substantially reminiscent of the hull shaping of certain boats. It is substantially symmetrically formed about a vertical longitudinal median plane. An important and significant feature of the shaping of the head 10 lies in the conformity of a recess or cavity which, as will appear, opens upwardly of what is distinctly the top surface of the head, this dished recess or cavity being indicated at 21. The cavity is bounded by a peripheral margin 22, the sides of which are distinctly divergent from front to rear of the head, and along the rear portion such margin is substantially rectilinear and transverse of the head. The recess 21 is shallow, almost to the point of disappearance in its frontal zone or area of origin, just back of the prow 17, whence it is gradually deepened toward the rear of the recess and attains a region of maximum depth just forwardly of the rear portion 20 in which region the recess is bounded by a well defined upstanding flange or lip 23. Considering the formation of the recess 21 in successive transverse sections, it will appear that this pocket or dished area is of substantially greater depth along its longitudinal median line, hence in the region of a vertical longitudinal median plane through the head 10. This general shaping of the cavity or recess 21 has been arrived at after innumerable experiments involving successive steps of gradually deepening the recess, and of varying its depth and conformity in its different parts, whereby to realize the most alluring and life-like movements of the lure.

It is of course obvious to skilled fishermen that, in recognition of the habits of different game fish, it is sometimes desirable to set the plug or bait to operate at a substantial depth; under other conditions to operate at a short distance below the surface, hence at an intermediate depth, and for still other fish or conditions of fishing, best results may be had by causing the lure to operate substantially on the surface. With the present improvements it is, as far as is known, possible for the first time to select the general depth or range thereof at which the bait will run under influence of the line. This facility is realized in the present example by the provision of a pendant weight 25. This may of itself be of a usual pear-shaped form and is of a considerable mass in proportion to that of the head. The weight is provided at its top with an eye 26 by which it is suspended in a selected seat or space 27 between adjacent convolutions 28 of a wire coil, formed after the manner of a coil spring with widely spaced turns. The ends of the coil spring generally indicated at 30, are indicated at 31, and constitute anchorage elements extending securely into the solid material of the body of head 10.

It is a preference so to locate the coil 30, that high parts of its convolutions are only slightly spaced below what might be called the keel area of the head 10, with this purpose in mind: To change the fore-and-aft setting of the weight with respect to the head, hence to change its position along the longitudinal axis thereof, the eye of weight 25 is moved to the upper part of the coil 30, then moved in a forward or rear position, according to desired adjustment. In so doing, the clearance between the coil 30 and the body is barely sufficient to permit the eye 26 to pass, such movement normally causing a deflection of the adjacent convolutions. Once the adjusted position is attained, the weight is brought downwardly into the selected seat 27, and its casual or unintended displacement is prevented by the minimal clearance between the coil and the body of head 10.

There has heretofore been discussed the function of the weight 25, by virtue of the facilities for adjustment of its location, in effecting control of the general range of depth at which the lure or plug will operate. The weight 25 being enabled to swing in any direction, will serve obviously as a stabilizing agency. Obviously such a weight may be employed with advantages in certain types of casting bait other than that selected for present disclosure.

Even though the weight 25 be mounted for free swinging movement as shown, but without the longitudinal adjustment, it will still exhibit a number of advantages when utilized in combinations other than presently disclosed. The best realization of these several features is attained by their coaction in the same structure. The primary motion imparted to the plug or bait by virtue of the combination of the weight and the formed recess 21 consists of a series of slow, alternately reversed bank-and-turn movements of the bait. Incident to such movement, the stabilizing influence of the weight 25 will now be apparent, in that the sharper the bank, the greater the restoring effect of the pendant weight. The result is a realistic and alluring life-like movement of the bait which is very attractive to most prevalent game fish, particularly those of fresh water varieties. By substituting a weight 25 of reduced mass, the bait may exhibit a somewhat faster change of course, and through an added control with the aid of the line, may even assume a more or less spiral course. The alternately reversed, slow bank-and-turn motion is, however, that which is preferred, and which will be realized by the bait as shown.

A secondary form of movement which is imparted concurrently with the primary movement aforesaid, results from the fluid reaction of the water in entering the dished or recessed area 21 followed by the reaction of the "stream" through the recess upon the lip or flange at the rear thereof. This upstanding portion creates a definite life-like bobbing motion, i. e., an alternate up-and-down movement which may be described as a wave-like movement of the bait with a sinuous action on the appending portions such as 11 and 13. This action serves incidentally to impart a distinct wiggling motion to a wiggler such as 13, or to a bucktail or other flexible caudal appendage. The combination of the aforesaid primary and secondary motions, the first of which particularly is subject to considerable variation, results in a markedly effective bait.

An important novel effect is realized with the bait containing the features described, particularly when in motion somewhat below the surface. In such case the head will be propelled nose down, and the recess and rear lip thereof exhibit the startling and effective result of causing a divergence of the elements of a bucktail, Hawaiian wiggler and similar threaded or foliate appendages. Furthermore a slow vibration is imparted to such streamers, in a life-like semblance to the legs or similar appendages of certain live bait. This effect is believed due to oppositely swirling eddies just back of the bait under the conditions noted.

It will have been understood that considerable departure is possible in structure and arrangements of the parts rearwardly of the head 10, inasmuch as the action is imparted primarily by the head cavitation and the mounting of the weight and adjustment facilities in connection therewith.

Although the invention has been described by making detailed reference to the description of a preferred embodiment, the detail of description should be understood in an instructive rather than in any limiting sense, numerous variants being possible within the scope of the claims hereunto appended.

I claim as my invention:

1. In a fish lure of plug type, a solid body characterized by a frontal, top recessed portion, a variably positionable pendant weight and a convolute wire element extending longitudinally of said body close to and below said recessed portion, the pendant weight having an eye through which the wire element extends, the weight being disposable in selected positions along the body by introduction of the eye to the different convolutions of the wire element, said recessed portion in coaction with the variably positionable weight, enabling a variable motion of the lure incident to movement thereof through the water.

2. In a fish lure of the nature of a plug adapted for use in casting and the like, a solid body having a recess formed in the top face thereof and a forwardly presented parting edge, said body being of increasing depth from said edge rearwardly to a zone located rearwardly of said recess, said recess being of a gradually increasing width and depth from front to rear and being of substantially the greatest depth close to its rearmost portion, a line receiving eye in said recess in the region of its greatest depth, a pendant weight provided with a supporting eye, and a weight supporting spring extending longitudinally beneath said body in proximity thereto and formed to present a series of longitudinally spaced recesses adapted selectively to receive the eye of said weight whereby to permit a longitudinal adjustment of the weight with variation of the center of gravity of the lure in a fore and aft direction, said spring being arranged relative to said body to yieldably retain the eye of the weight in adjusted position.

3. The combination and arrangement of elements and features as recited by claim 2, but further characterized in that the weight supporting spring consists of a convolute wire element in which the eye of the weight is adapted to be disposed in selective positions by introduction of the eye to any of the different convolutions.

CORBAN MINTNER.

REFERENCES CITED

The following references are of record in the file of this patent:

UNITED STATES PATENTS

| Number | Name | Date |
| --- | --- | --- |
| 1,193,077 | Schoonmaker | Aug. 1, 1916 |
| 1,220,921 | Wilson | Mar. 27, 1917 |
| 1,315,408 | Habbeth | Sept. 9, 1919 |
| 1,316,040 | Jamison | Sept. 16, 1919 |
| 1,733,777 | Comstock | Oct. 29, 1929 |
| 1,986,991 | Wilson | Jan. 8, 1935 |
| 2,036,946 | Malecek | Apr. 7, 1936 |
| 2,205,472 | Fagerholm | June 25, 1940 |